(12) United States Patent
Omori et al.

(10) Patent No.: US 7,461,389 B2
(45) Date of Patent: Dec. 2, 2008

(54) ADAPTOR MEMBER FOR A DISC DRIVE

(75) Inventors: Kiyoshi Omori, Tokyo (JP); Satoshi Muto, Chiba (JP); Yuji Suzuki, Kanagawa (JP); Toru Tanaka, Kanagawa (JP); Hideho Maeda, Tokyo (JP); Naoya Hoshino, Kanagawa (JP)

(73) Assignee: Sony Corporation, Tokyo (JP)

( * ) Notice: Subject to any disclaimer, the term of this patent is extended or adjusted under 35 U.S.C. 154(b) by 552 days.

(21) Appl. No.: 11/187,116

(22) Filed: Jul. 22, 2005

(65) Prior Publication Data

US 2006/0026616 A1     Feb. 2, 2006

(30) Foreign Application Priority Data

Jul. 28, 2004    (JP)    ............................ P2004-220757

(51) Int. Cl.
 *G11B 7/08* (2006.01)
(52) U.S. Cl. .................................................. 720/658
(58) Field of Classification Search ................ 720/658, 720/676, 675, 758
See application file for complete search history.

(56) References Cited

U.S. PATENT DOCUMENTS 6,597,652 B2 * 7/2003 Obara ......................... 720/675
7,334,246 B2 * 2/2008 Park et al. ................... 720/676

FOREIGN PATENT DOCUMENTS

JP      11232804 A    *  8/1999
JP    2002-025074 A       1/2002

* cited by examiner

*Primary Examiner*—David D Davis
(74) *Attorney, Agent, or Firm*—Wolf, Greenfield & Sacks, P.C.

(57) ABSTRACT

A common optical pickup can be mounted in any of disc drive units having respective pairs of oppositely disposed guide shafts that are separated from each other by different distances. The present invention provides an adaptor member for allowing an optical pickup currently mounted in a first disc drive unit having respective main shaft and sub shaft arranged oppositely relative to and in parallel with each other and separated from each other by a distance to be mounted in a second disc drive unit having respective main shaft and sub shaft arranged oppositely relative to and in parallel with each other and separated from each other by a distance, the distance separating the main shaft and the sub shaft of the first disc drive unit being smaller than the distance separating the main shaft and the sub shaft of the second disc drive unit, the adaptor member being adapted to be fitted to a second supporting section of the optical pickup mounted in the first disc drive unit, the second supporting section being formed with a guide groove for pinching the sub shaft and arranged opposite to a first supporting section formed with a guide hole for allowing the main shaft to run through it, the adaptor member having a guide groove for pinching the sub shaft of the second disc drive unit.

7 Claims, 14 Drawing Sheets

ADAPTOR MEMBER FOR A DISC DRIVE

CROSS REFERENCES TO RELATED APPLICATIONS

The present invention contains subject matter related to Japanese Patent Application JP 2004-220757 filed in the Japanese Patent Office on Jul. 28, 2004, the entire contents of which being incorporated herein by reference.

BACKGROUND OF THE INVENTION

1. Field of the Invention

This invention relates to an adaptor member for sharing an optical pickup between disc drive units having respective main axes and sub axes oppositely disposed and separated by different distances. The present invention also relates to disc drive units having respective main axes and sub axes oppositely disposed and separated by different distances and adapted to share a common optical pickup and a disc drive apparatus having such a disc drive unit.

2. Description of the Related Art

Optical discs such as CDs (compact discs) and DVDs (digital versatile discs) and magneto-optical discs such as MOs (magneto-optical discs) and MDs (mini discs) are known. A variety of disc drive apparatus have been marketed for such optical discs.

For example, referring to FIG. 1, a known disc drive unit 200 of a disc drive apparatus comprises an optical disc rotary drive mechanism 201 for driving an optical disc to rotate, an optical pickup 202 for carrying out an operation of writing signals onto or reading signals from an optical disc that is driven to rotate by the optical disc rotary drive mechanism 201 and a pickup feed mechanism 203 for driving and feeding the optical pickup 202 to move in a radial direction of the optical disc. The above listed components of the disc drive unit 200 are fitted to a base 204.

The disc rotary drive mechanism 201 includes a flat spindle motor 206 that is equipped with a turntable 205 for holding an optical disc. The spindle motor 206 drives the optical disc to rotate integrally with the turntable 205.

The optical pickup 202 writes signals onto or reads signals from the optical disc by converging the beam of light (laser beam) emitted from a semiconductor laser by means of an objective lens 207, irradiating the converged beam of light onto the signal recording surface of the optical disc and detecting the returning beam of light reflected by the signal recording surface of the optical disc by a photodetector.

The pickup feed mechanism 203 includes a pair of guide shafts 208a, 208b that support the optical pickup 202 so as to be movable in a radial direction of the optical disc, a rack member 209 fitted to the optical pickup 202, a lead screw 210 to be engaged with the rack member 209 and a stepping motor 211 for driving the lead screw 210 to rotate. As the stepping motor 211 drives the lead screw 210 to rotate, it consequently drives the rack member 209 that is engaged with the lead screw 210 to be displaced with the optical pickup 202 in a radial direction of the optical disc.

The base 204 has a table aperture 212a for exposing the turntable 205 and a pickup aperture 212b for exposing the optical pickup 202. The two apertures 212a, 212b are continued from each other. A number of components including the spindle motor 206, the opposite ends of the pair of guide shafts 208a, 208b, the lead screw 210 and the stepping motor 211 are fitted to the main surface of the disc drive unit that is opposite to the other main surface where the turntable 205 and the optical pickup 202 are exposed to the outside by way of the apertures 212a, 212b.

In the disc drive apparatus that has the above described configuration and is adapted to record information signals onto or reproduce information signals from an optical disc, the disc rotary drive mechanism 201 drives the optical disc rotate and the pickup feed mechanism 203 drives and feeds the optical pickup 202 to move in a radial direction of the optical disc so that the optical pickup 202 operates for writing signals onto or reading signals from the optical disc. As a result, information signals are recorded onto or reproduced from the target recording tracks of the optical disc.

Meanwhile, the disc drive unit 200 having a configuration as described above is designed to be mounted in a very low profile disc drive apparatus, which very low profile disc drive apparatus is by turn to be mounted in a low profile host appliance such as a notebook-sized personal computer. In short, such a disc drive unit 200 is subjected to various restrictions in terms of its height. Additionally, the disc drive units 200 of disc drive apparatus that are marketed in these days are provided with an optical pickup 202 adapted to operate with discs of different recording formats such as CDs and DVDs. Optical pickups 202 adapted to operate with BDs (blue-ray discs) having a high density recording format are being developed.

Thus, the number of parts to be mounted in optical pickups 200 is ever increasing. Under these circumstances, there is a tendency of extending the width rather than the height of optical pickups 202 to be mounted in disc drive units 200 of the type under consideration in order to secure the space for mounting the parts. Then, the distance separating a pair of oppositely disposed guide shafts 208a, 208b for supporting the optical pickup 202 from each other is also increasing inevitably.

However, a disc drive unit 200 comprising a pair of oppositely disposed guide shafts 208a, 208b that are separated from each other by a large distance requires a new optical pickup 202 that matches the distance separating the pair of guide shafts 208a, 208b. In other words, a known disc drive apparatus requires the use of optical pickups 202 that are dedicated to respectively disc drive units 200 of different types.

In other words, it is not possible to share a single optical pickup 202 between two or more than two disc drive units 200 having respective pairs of guide shafts 208a, 208b separated by different distances in known disc drive apparatus to consequently give rise to a problem of high manufacturing cost. More specifically, if optical pickups 202 are prepared for disc drive units 200 of each type, dedicated metal molds are required for manufacturing such optical pickups to raise the manufacturing cost. Additionally, it is not possible to use common components and common manufacturing facilities to consequently raise the cost of managing components and that of replacing facilities.

Known published documents that relate to the present invention include Patent Document 1: Japanese Patent Application Laid-Open Publication No. 2002-25074. The Patent Document 1 describes an optical pickup apparatus having a base plate to which an attachment is fitted in order to make it possible to use a common optical base table for holding an objective lens and a lens drive section.

SUMMARY OF THE INVENTION

The present invention has been proposed in view of the above identified circumstances, and it is desirable to provide an adaptor that allows a common optical pickup to be mounted in any of disc drive units having respective pairs of oppositely disposed guide shafts that are separated from each other by different distances and adapted to support the optical pickup and allows it to slide along, them.

It is also desirable to provide a disc drive unit that can share an optical pickup with one or more than one other disc drive units having respective pairs of oppositely disposed guide shafts that are separated from each other by different distances by fitting such an adaptor member so as to reduce the cost.

It is also desirable to provide a disc drive apparatus comprising such a disc drive unit so as to reduce the cost.

According to the present invention, there is provided an adaptor member for allowing an optical pickup currently mounted in a first disc drive unit having respective main shaft and sub shaft arranged oppositely relative to and in parallel with each other and separated from each other by a distance to be mounted in a second disc drive unit having respective main shaft and sub shaft arranged oppositely relative to and in parallel with each other and separated from each other by a distance, the distance separating the main shaft and the sub shaft of the first disc drive unit being smaller than the distance separating the main shaft and the sub shaft of the second disc drive unit, the adaptor member being adapted to be fitted to a second supporting section of the optical pickup mounted in the first disc drive unit, the second supporting section being formed with a guide groove for pinching the sub shaft and arranged opposite to a first supporting section formed with a guide hole for allowing the main shaft to run through it, the adaptor member having a guide groove for pinching the sub shaft of the second disc drive unit.

According to the present invention, there is provided an adaptor member for allowing an optical pickup currently mounted in a first disc drive unit having respective main shaft and sub shaft arranged oppositely relative to and in parallel with each other and separated from each other by a distance to be mounted in a second disc drive unit having respective main shaft and sub shaft arranged oppositely relative to and in parallel with each other and separated from each other by a distance, the distance separating the main shaft and the sub shaft of the first disc drive unit being smaller than the distance separating the main shaft and the sub shaft of the second disc drive unit, the adaptor member being fitted to or integrally formed with the sub shaft of the second disc drive unit and having a guide section to be pinched by a guide groove formed in a second supporting section of the optical pickup, the second supporting section being arranged opposite to a first supporting section formed with a guide hole for allowing the main shaft to run through it.

According to the present invention, there is provided a disc drive unit including a disc rotary drive mechanism for driving an optical disc to rotate, an optical pickup for writing signals on or reading signals from the optical disc being driven to rotate by the disc rotary drive mechanism, and a pickup feed mechanism for feeding the optical pickup in a radial direction of the optical disc, which components are integrally arranged on a base, the pickup feed mechanism including: a main shaft and a sub shaft; a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged oppositely relative to each other; an adaptor member adapted to be fitted to the second supporting section and formed with a guide groove for pinching the sub shaft; and a displacement/drive mechanism for driving the pickup base in a radial direction of the optical disc, the pickup base being supported and allowed to slide in a radial direction of the optical disc by making the main shaft run through the guide hole of the first supporting section and the sub shaft to be pinched by the guide groove of the adaptor member.

According to the present invention, there is provided a disc drive unit including a disc rotary drive mechanism for driving an optical disc to rotate, an optical pickup for writing signals on or reading signals from the optical disc being driven to rotate by the disc rotary drive mechanism, and a pickup feed mechanism for feeding the optical pickup in a radial direction of the optical disc, which components are integrally arranged on a base, the pickup feed mechanism including: a main shaft and a sub shaft; a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged oppositely relative to each other; an adaptor member adapted to be fitted to or integrally formed with the sub shaft and having a guide section to be pinched by the guide groove formed in the second supporting section; and a displacement/drive mechanism for driving the pickup base in a radial direction of the optical disc, the pickup base being supported and allowed to slide in a radial direction of the optical disc by making the main shaft run through the guide hole of the first supporting section and the guide section of the adaptor member to be pinched by the guide groove of the second supporting section.

According to the present invention, there is provided a disc drive apparatus having a disc drive unit including a disc rotary drive mechanism for driving an optical disc to rotate, an optical pickup for writing signals on or reading signals from the optical disc being driven to rotate by the disc rotary drive mechanism, and a pickup feed mechanism for feeding the optical pickup in a radial direction of the optical disc, which components are integrally arranged on a base, and a cabinet for containing the disc drive unit, the pickup feed mechanism including: a main shaft and a sub shaft; a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged oppositely relative to each other; an adaptor member adapted to be fitted to the second supporting section and formed with a guide groove for pinching the sub shaft; and a displacement/drive mechanism for driving the pickup base in a radial direction of the optical disc, the pickup base being supported and allowed to slide in a radial direction of the optical disc by making the main shaft run through the guide hole of the first supporting section and the sub shaft to be pinched by the guide groove of the adaptor member.

According to the present invention, there is provided a disc drive apparatus having a disc drive unit including a disc rotary drive mechanism for driving an optical disc to rotate, an optical pickup for writing signals on or reading signals from the optical disc being driven to rotate by the disc rotary drive mechanism, and a pickup feed mechanism for feeding the optical pickup in a radial direction of the optical disc, which components are integrally arranged on a base, and a cabinet for containing the disc drive unit, the pickup feed mechanism including: a main shaft and a sub shaft; a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged oppositely relative to each other; an adaptor member adapted to be fitted to or integrally formed with the sub shaft and having a guide section to be pinched by the guide groove formed in the second supporting section; and a displacement/drive mechanism for driving the pickup base in a radial direction of the optical disc, the pickup base being supported and allowed to slide in a radial direction of the optical disc by making the main shaft run through the guide hole of the first supporting section and the guide section of the adaptor member to be pinched by the guide groove of the second supporting section.

As described above, according to the present invention, it is possible to mount an optical pickup to be mounted in a disc drive unit whose main shaft and sub shaft are separated from each other by a smaller distance, in a disc drive unit whose main shaft and sub shaft are separated from each other by a greater distance, by fitting an adaptor member. Therefore, according to the present invention, it is possible to mount a common optical pickup in any of disc drive units having respective main shafts and sub shafts arranged oppositely relative to and in parallel with each other and separated from each other by different distances. Thus, it is possible to reduce the cost.

DETAILED DESCRIPTION OF THE PREFERRED EMBODIMENTS

Now, the present invention will be described by referring to the accompanying drawings that illustrate preferred embodiments of adaptor member, disc drive unit and disc drive apparatus according to the invention.

Figure 1:
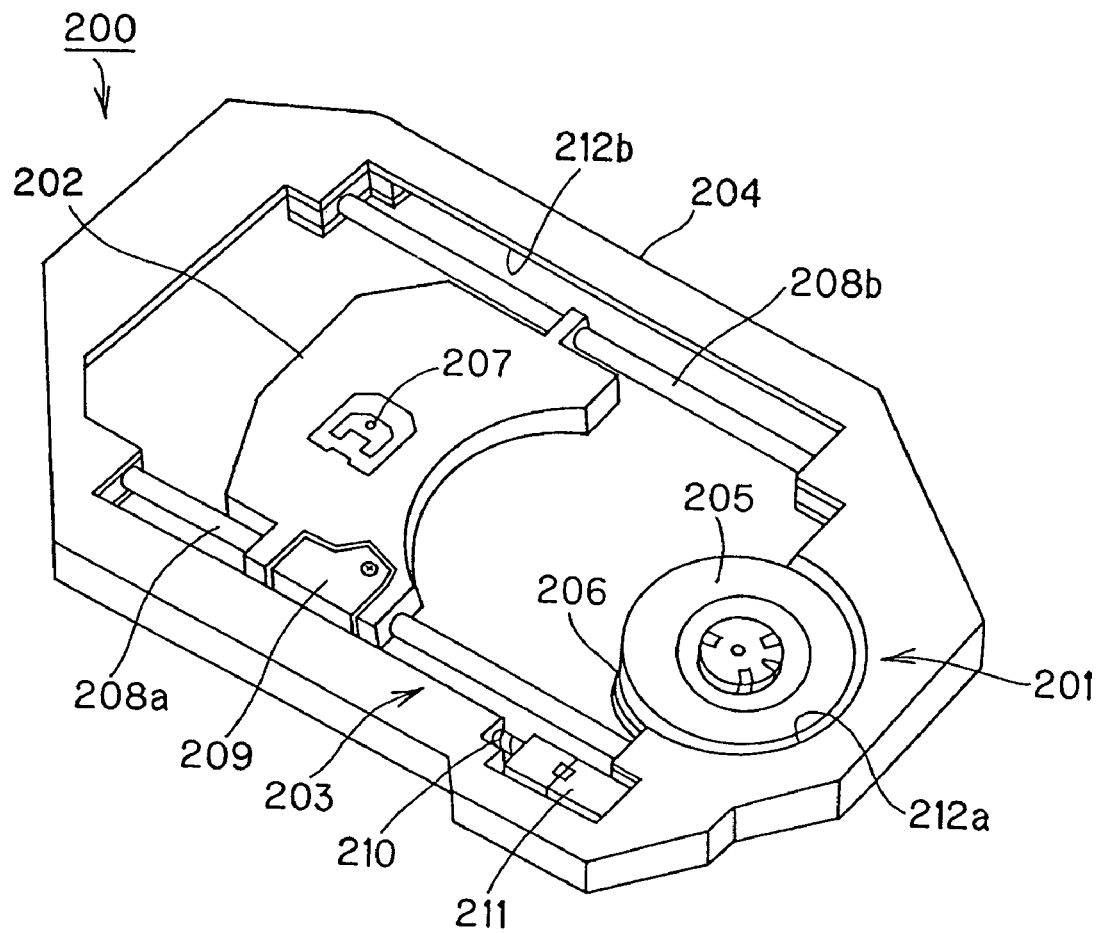
FIG. 1 is a schematic perspective view of a disc drive unit of a known disc drive apparatus.
Figure 2:
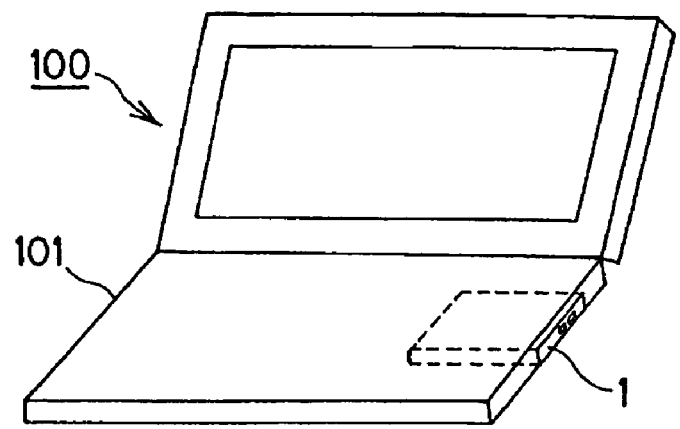
FIG. 2 is a schematic perspective view of a notebook-sized personal computer carrying a disc drive apparatus according to the invention.

FIG. 2 is a schematic perspective view of a notebook-sized personal computer 100 carrying a tray type disc drive apparatus 1 according to the invention that is mounted in the computer main body 101. As seen from FIG. 3, the overall height of the disc drive apparatus 1 is reduced to, for example, about 9.5 mm but capable of recording information or reproducing information from an optical disc 2 such as a CD (compact disc) or a DVD (digital versatile disc) contained in it.

When an adaptor member according to the invention, which will be described in greater detail hereinafter, is fitted to the disc drive apparatus 1, the optical pickup that is mounted in the disc drive unit of the disc drive apparatus having a shorter distance between its oppositely disposed pair of guide shafts including a main shaft and a sub shaft can be shifted to the other disc drive unit having a longer distance between its oppositely disposed pair of guide shafts.

Figure 4:
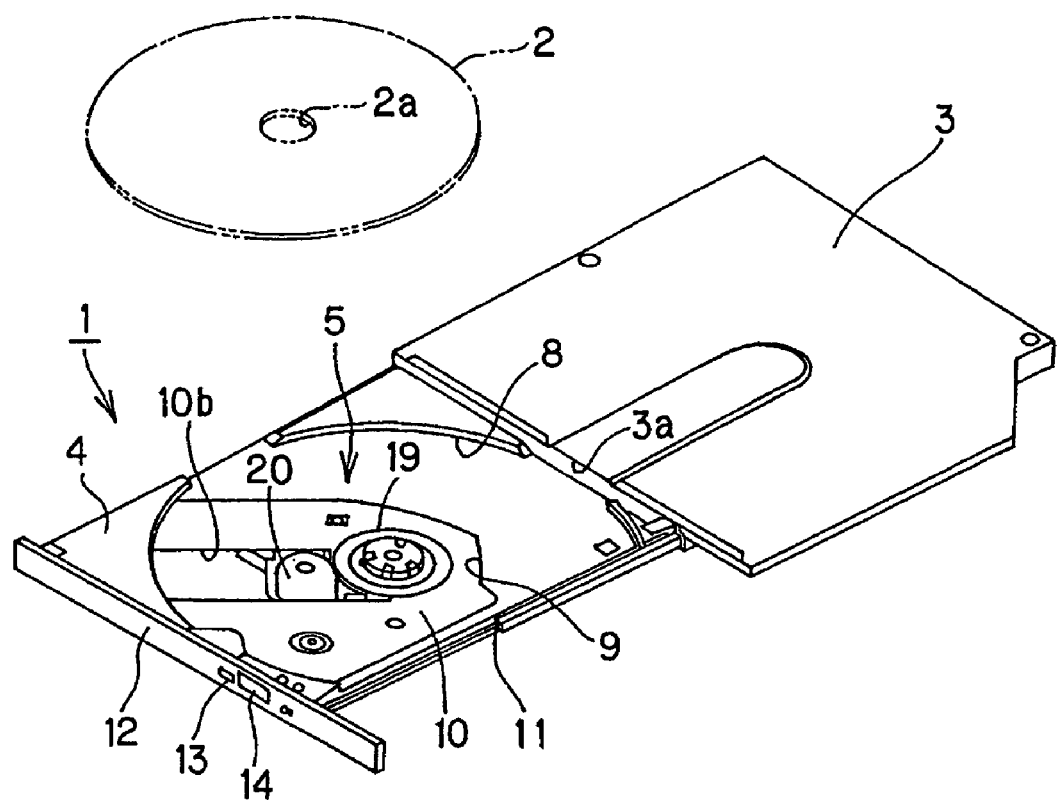
FIG. 4 is a schematic perspective view of the above disc drive apparatus in a state where the disc tray is drawn out.
Figure 5:
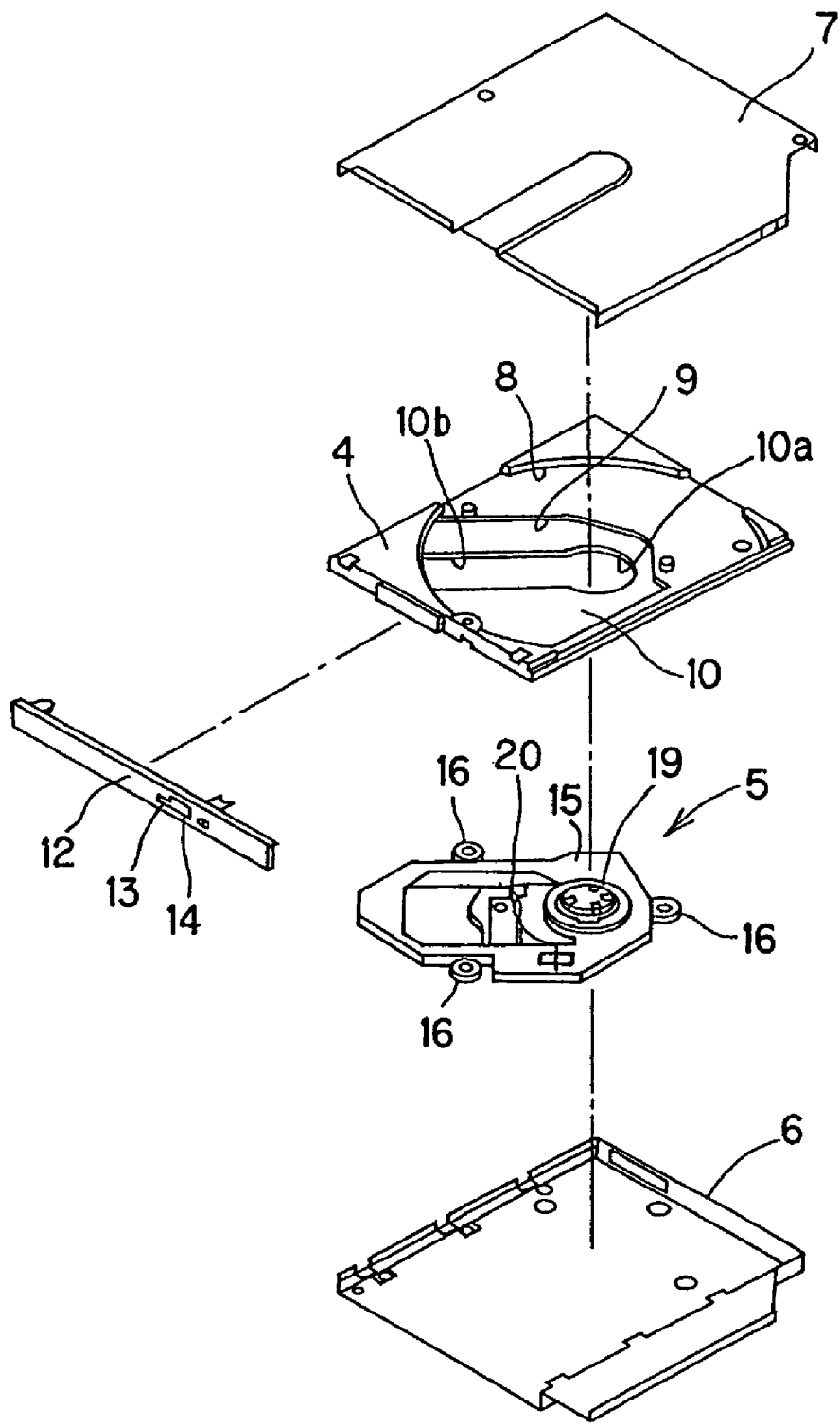
FIG. 5 is an exploded schematic perspective view of the above disc drive apparatus.

More specifically, as shown in FIGS. 4 and 5, the disc drive apparatus 1 comprises a cabinet 3, a disc tray 4 that can be moved into and out of the cabinet 3 through a tray entrance/exit port 3a formed at the front side of the cabinet 3 in a horizontal direction and a disc drive unit 5 fitted to the disc tray 4.

The cabinet 3 is formed by fitting a top plate 7, which is made of a metal plate, to a flat and substantially box-shaped lower cabinet body 6, which is also made of a metal plate, by means of screws so as to cover the top aperture of the lower cabinet body 6. The cabinet 3 has an opening at the front side thereof that operates as tray entrance/exit port 3a and a containing space is defined in the inside thereof to contain the disc tray 4 therein.

The disc tray 4 is a flat molded body of a resin material and has a substantially rectangular profile as a whole. It is provided at the top surface thereof with a disc holding recessed section 8 having a profile corresponding to that of an optical disc 2. An aperture 9 for upwardly exposing the disc drive unit 5 fitted to the lower surface of the disc tray 4 is formed through the bottom of the disc holding recessed section 8. A top cover 10 is fitted to the top surface of the disc drive unit 5 that is exposed to the outside through the aperture 9 of the disc tray 4. The top cover 10 is provided with a substantially semicircular aperture 10a having a profile corresponding to that of a table exposing aperture 18a formed at the base 15 and a substantially regulator apertures 10b having a profile corresponding to that of a pickup exposing aperture 18b, the apertures 10a, 10b being continuous from each other.

Figure 3:
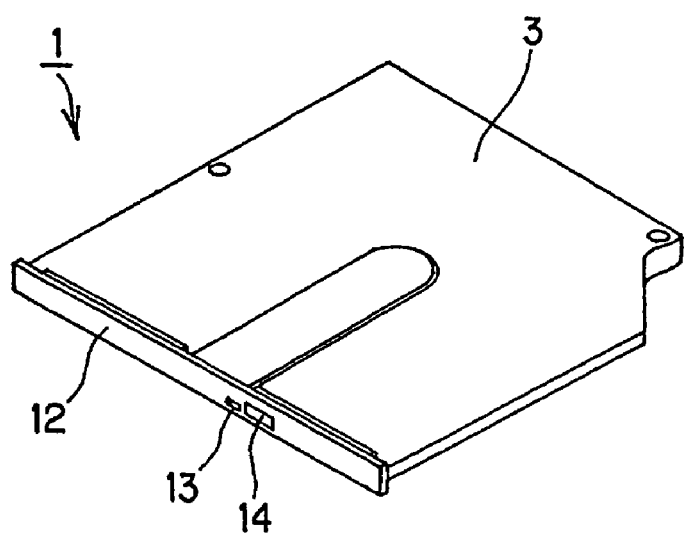
FIG. 3 is a schematic perspective view of the above disc drive apparatus in a state where it contains a disc tray.

The disc tray 4 is supported by a guide rail mechanism 11 arranged between the lateral surfaces thereof and the inner surfaces of the lower cabinet body 6 so as to be able to slide between a contained position where it is drawn into the inside of the cabinet 3 through the tray entrance/exit port 3a and contained in the cabinet 3 as shown in FIG. 3 and a drawn-out position where it is drawn out to the outside of the cabinet 3 through the tray entrance/exit port 3*a* as shown in FIG. 4.

A flat and substantially rectangular front panel 12 is fitted to the front side of the disc tray 4 so as to open and close the tray entrance/exit port 3*a* of the cabinet 3. The front panel 12 is provided on the front surface thereof with a display section 13 having a lamp that is turned on when the optical disc 2 is accessed to display the access and an eject button 14 to be depressed when ejecting the disc tray 4 to the outside of the cabinet 3.

When the disc tray 4 is contained in the cabinet 3, it is locked by a lock mechanism (not shown) and prevented from sliding toward the front side of the cabinet 3. When the eject button 14 is depressed in the state where the disc tray 4 is locked by the lock mechanism, the disc tray 4 is unlocked so that it is drawn out to the front side of the cabinet 3 through the tray entrance/exit port 3*a*. Thus, it is possible to draw out the disc tray 4 to the drawn-out position by way of the try entrance/exit port 3*a* due to the provision of the eject button 14. On the other hand, when the disc tray 4 is pushed into the cabinet 3 to take the contained position in the cabinet 3, it is locked again by the lock mechanism and prevented from sliding toward the front side of the cabinet 3.

Figure 6:
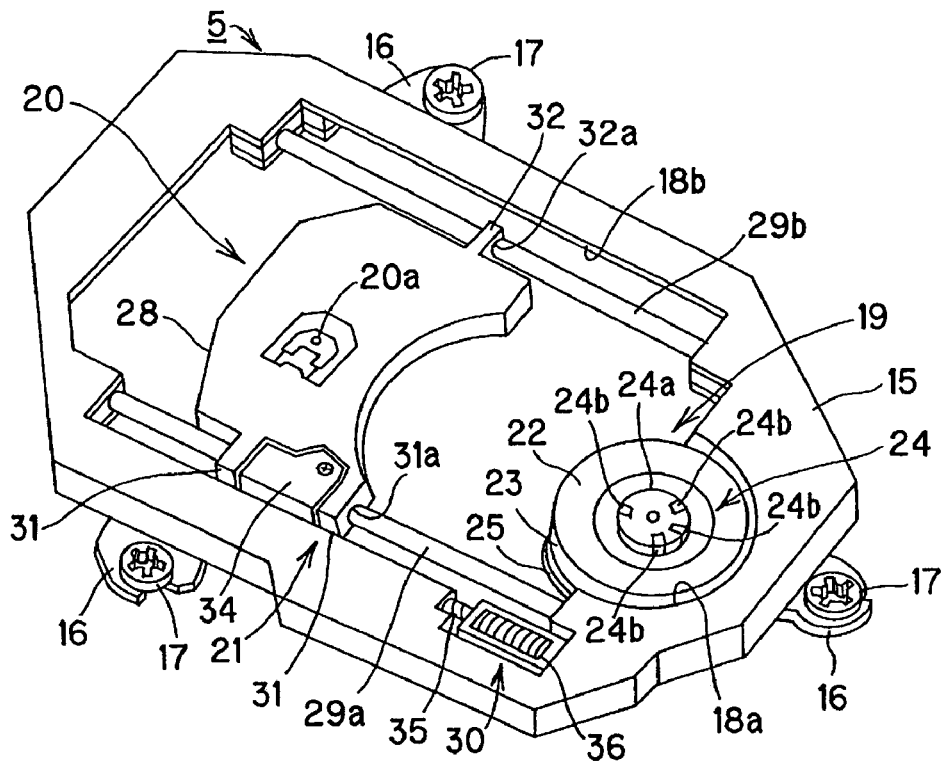
FIG. 6 is a schematic perspective view of the first disc drive unit as viewed from above.
Figure 7:
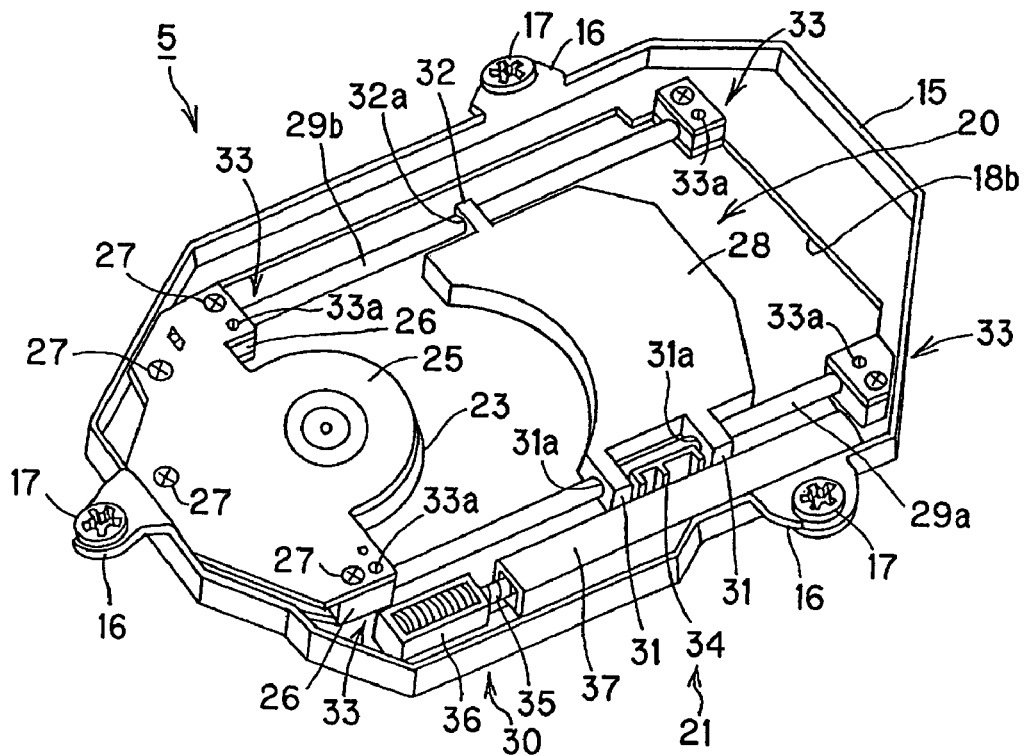
FIG. 7 is a schematic perspective view of the first disc drive unit as viewed from below.

As shown in FIGS. 6 and 7, the disc drive unit 5 includes a base 15 formed by punching a metal plate to produce a blank having a predetermined profile and bending a narrow peripheral area thereof downward and three supporting pieces 16 are outwardly bent from the edge of the downwardly bent part of the base 15. An insulator 17 that is made of a resilient material such as rubber is fitted to each of the supporting pieces 16 for the purpose of absorbing vibrations. The base 15 is rigidly fitted to and supported by a spindle (not shown) arranged at the lower surface of the disc tray 4 by way of the supporting pieces 16 to which the respective insulators 17 are fitted. A substantially semicircular table exposing aperture 18*a* for exposing a turntable 22, which will be described in greater detail hereinafter, and a substantially rectangular pickup exposing aperture 18*b* for exposing the optical pickup 20, the profile of which corresponds to the movable range of the optical pickup 20 that is driven to move for a feeding operation in a radial direction of the optical disc 2 as will be described in greater detail hereinafter, are continuously formed through the main surface of the base 15.

The disc drive unit 5 comprises a disc rotary drive mechanism 19 for driving the optical disc 2 to rotate, an optical pickup 20 for writing a signal onto or reading a signal from the optical disc 2 being driven to rotate by the disc rotary drive mechanism 19 and a pickup feed mechanism 21 for feeding the optical pickup 20 in a radial direction of the optical disc 2. The disc drive unit 5 has a very low profile structure to which the above listed components are fitted to the base 15 as integral parts thereof.

The disc rotary drive mechanism 19 has a flat spindle motor 23 carrying the turntable 22 for receiving an optical disc 2 on the top surface thereof. The spindle motor 23 drives the optical disc 2 placed on the turntable to rotate.

A chucking mechanism 24 is arranged at a central part of the turntable 22 for the purpose of removably holding the optical disc 2. The chucking mechanism 24 has an engaging projection 24*a* to be engaged with the central hole 2*a* of the optical disc 2 and a plurality of anchor claws 24*b* for anchoring the optical disc 2 that is engaged with the engaging projection 24*a* around the central hole 2*a* of the optical disc 2. Thus, the chucking mechanism 24 is adapted to hold the optical disc 2 on the turntable 22, while centering the optical disc 2 relative to the turntable 22.

The spindle motor 23 is supported by a support plate 25, which support plate 25 is fitted to the bottom surface of the base 15 by way of a spacer member 26 by means of a plurality of screws 27 so as to make the turntable 22 project slightly from the top surface of the base 15 through the turntable exposing aperture 18*a*.

The optical pickup 20 is adapted to write a signal onto or read a signal from the optical disc 2 by focusing the beam of light emitted from a semiconductor laser (not shown) that operates as light source by means of an objective lens 20*a*, irradiating the signal recording surface of the optical disc 2 with the beam of light and detecting the returning beam of light that is reflected by the signal recording surface of the optical disc 2 by means of a photodetector (not shown).

The optical pickup 20 also has an objective lens drive mechanism (not shown) such as a biaxial actuator for driving the objective lens 20*a* in the direction of the optical axis (focusing direction) and in a direction perpendicular to recording track of the optical disc 2 (tracking direction) for displacement. More specifically, the optical pickup 20 operates for focus servo of focusing the objective lens 20*a* on the signal recording surface of the optical disc 2, while displacing the objective lens 20*a* both in the focusing direction and in the tacking direction by means of a biaxial actuator and for tracking servo of constantly placing the spot of the beam of light focused by the objective lens 20*a* on the recording track according to the signal detected by the above described photodetector from the optical disc 2. Note that the object lens drive mechanism may alternatively be a tri-axial actuator that can adjust the inclination (skew) of the objective lens 20*a* relative to the signal recording surface of the optical disc 2 so as to irradiate the beam of light that is converged by the objective lens 20*a* perpendicularly onto the signal recording surface of the optical disc 2 in addition to operating for focus servo and tracking servo.

The pickup feed mechanism 21 includes a pickup base 28 on which the components of the optical pickup 20 are mounted, a main shaft 29*a*, a sub shaft 29*b*, the main shaft 29*a* and the sub shaft 29*b* supporting the pickup base 28 so as to allow the latter to slide in a radial direction of the optical disc 2, and a displacement/drive mechanism 30 for driving and displacing the pickup base 28 supported by the main shaft 29*a* and the sub shaft 29*b* in the radial direction of the optical disc 2.

The pickup base 28 is arranged at a position where it is exposed to the outside through the pickup exposing aperture 18*b* of the base 15 and supported by the pair of shafts including the main shaft 29*a* and the sub shaft 29*b* so as to be able to slide along them. More specifically, the pickup base 28 is provided with a first pair of supporting pieces 31, through which respective guide holes 31*a* are bored to allow the main shaft 29*a* to pass through, and a second supporting piece 32 having a guide groove 32*a* for receiving and pinching the sub shaft 29*b*, the first pair of supporting pieces 31 and the second supporting piece 32 projecting from the respective lateral surfaces of the pickup base 28 in opposite directions. With this arrangement, the pickup base 28 is supported by the main shaft 29*a* and the sub shaft 29*b* so as to be able to slide along them and move in the pickup exposing aperture 18*b* of the base 15 in a radial direction of the optical disc 2.

The main shaft 29*a* and the sub shaft 29*b* are arranged in parallel with each other with a predetermined gap S1 separating them from each other and fitted at the opposite ends thereof to the bottom surface of the base 15 by way of a skew regulation mechanism 33. The skew regulation mechanism 33 supports the opposite ends of the main shaft 29*a* and those of the sub shaft 29*b* in such a way that the two shafts 29*a*, 29*b* can move in a direction perpendicular to the main surface of the base 15. Thus, the positions at which the main shaft 29*a* and the sub shaft 29*b* are supported at the opposite ends thereof and hence the inclination of the main shaft 29*a* and that of the sub shaft 29*b* can be adjusted by means of adjusting screws 33*a* in order to make the beam of light converged by the objective lens 20*a* of the optical pickup 20 irradiate the signal recording surface of the optical disc 2 in a direction perpendicular to the surface. It is also possible to regulate the distance between the optical pickup 20 and the signal recording surface of the optical disc 2 placed on the turntable 22.

Figure 8:
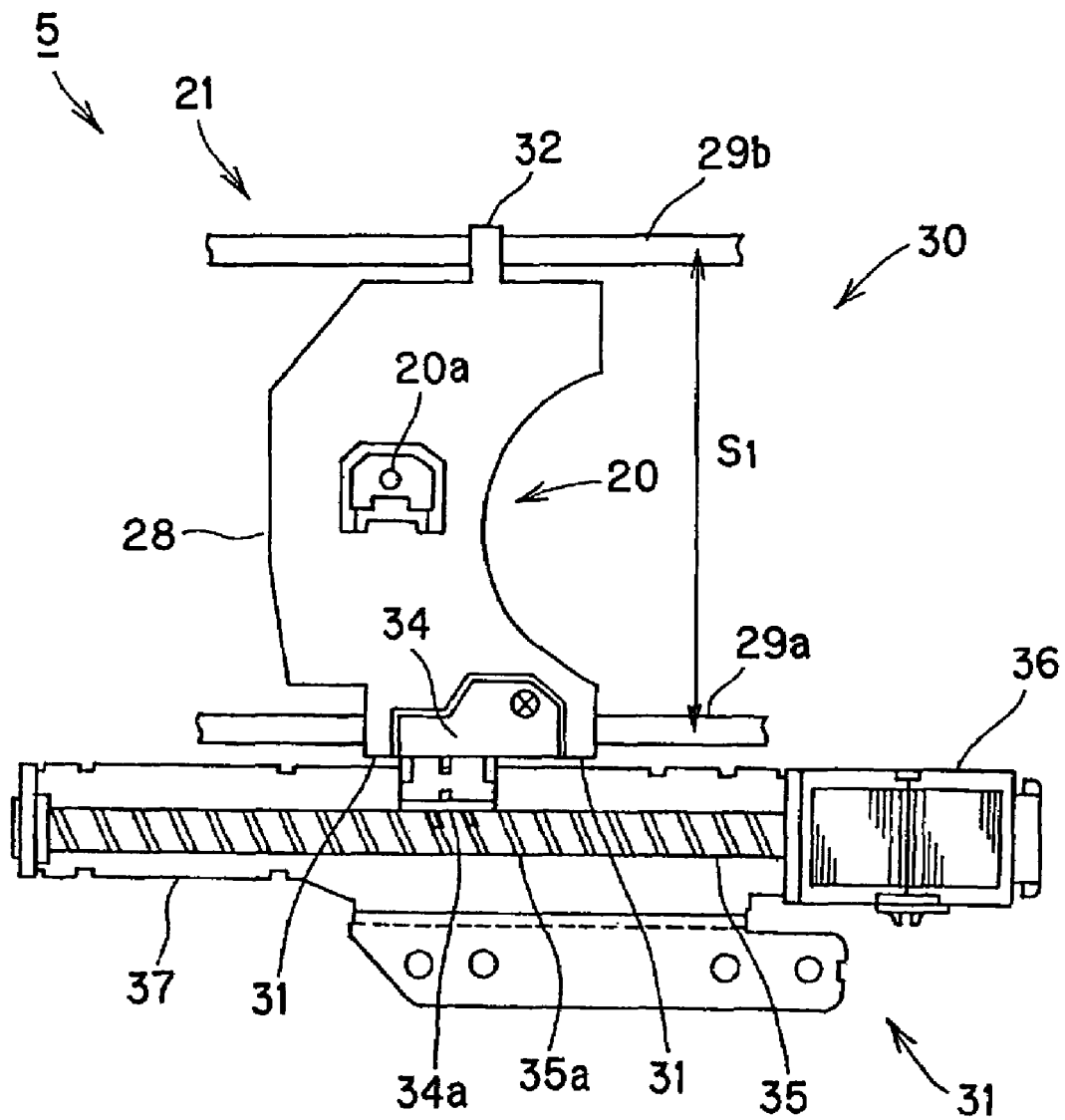
FIG. 8 is a schematic plan view of the first disc drive unit, showing a principal part thereof.

Referring to FIG. 8, a displacement/drive mechanism 30 includes a rack member 34 fitted to the pickup base 28, a feed screw 35 to be engaged with the rack member 34 and a drive motor 36 for driving the feed screw 35 to revolve.

The rack member 34 is arranged between the first pair of supporting pieces 31 and fitted at the base end side thereof to the pickup base 28 by means of screws and a rack section 34*a* to be engaged with the feed screw 35 arranged in parallel with the main shaft 29*a* is integrally formed with the rack member 34 at the front end side of the latter. The feed screw 35 is integrally formed with the drive shaft of the drive motor 36 and a spiral lead screw thread section 35*a* is formed on the outer peripheral surface thereof so as to be engaged with the rack section 34*a* of the rack member 34. The drive motor 36 is a so-called stepping motor that is adapted to drive the feed screw 35 to revolve according to the drive pulse applied to it. Both the feed screw 35 and the drive motor 36 are supported by a bracket 37 fitted to the lower surface of the base 15 by means of screws. The bracket 37 shows a profile produced by bending opposite ends of an oblong metal plate in the same direction and the drive motor 36 is rigidly held at the side of one of the ends of the bracket 37 with the feed screw 35 running through the bracket 37, while the front end of the feed screw 35 is held in a shaft hole formed through the other end of the bracket 37 and supported by the end so as to allow the feed screw 35 to freely revolve.

As the drive motor 36 drives the feed screw 35 to rotate, the displacement/drive mechanism 30 displaces the rack member 34 in the direction of the axis line of the feed screw 35 due to the engagement of the lead screw thread section 35*a* and the rack section 34*a* so that consequently the pickup base 28 supported by the main shaft 29*a* and the sub shaft 29*b* is driven and displaced in a radial direction of the optical disc 2.

As a recording or reproduction command is sent from the personal computer 100 to the disc drive apparatus 1 having the above described configuration in a state where the disc tray 4 that holds an optical disc 2 is contained in the cabinet 3, an information signal is recorded on or reproduced from the optical disc 2 according to the command. More specifically, the disc rotary drive mechanism 19 of the disc drive unit 5 drives the optical disc 2 to rotate and the optical pickup 20 operates for writing a signal on or reading a signal from the optical disc 2, while the pickup feed mechanism 21 feeding the optical pickup 20 in a radial direction of the optical disc 2.

Figure 9:
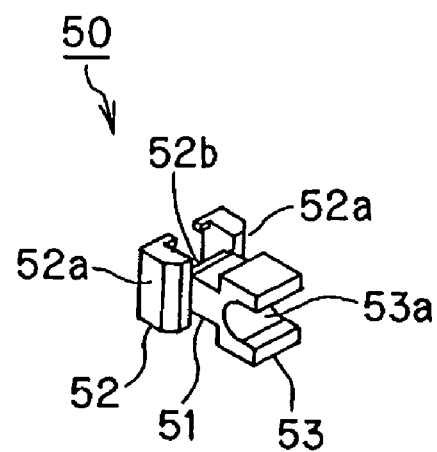
FIG. 9 is a schematic perspective view of an embodiment of adaptor member according to the invention.
Figure 10:
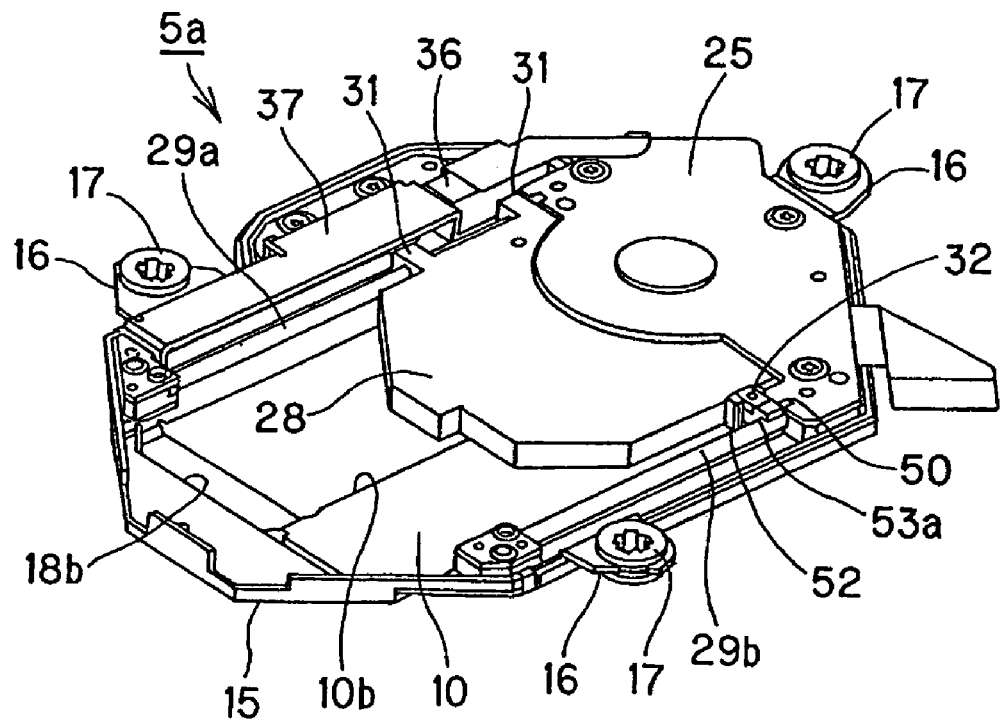
FIG. 10 is a schematic perspective view of the second disc drive unit to which the adaptor member of FIG. 9 is fitted.

Meanwhile, in this embodiment of disc drive apparatus 1 according to the invention, it is possible to mount the optical pickup 20 that is currently mounted in the above described embodiment of disc drive unit (to be referred to as first disc drive unit hereinafter) in another embodiment of disc drive unit (to be referred to as second disc drive unit hereinafter) 5*a* as shown in FIG. 10 whose main shaft 29*a* and sub shaft 29*b* are separated from each other by a distance greater than the distance separating the main shaft 29*a* and the sub shaft 29*b* of the first disc drive unit 5 by fitting an adaptor member 50 as shown in FIG. 9 to the second supporting piece 32 of the optical pickup 20.

Now, an embodiment of adaptor member 50 according to the invention and the second disc drive unit 5*a* to which the adaptor member 50 is fitted will be described in greater detail below.

Note that the first disc drive unit 5 and the second disc drive unit 5*a* have a substantially same configuration except that the distance separating the main shaft 29*a* and the sub shaft 29*b* that are oppositely disposed is different between the two disc drive units. Therefore, the components of the second disc drive unit 5*a* are denoted respectively by the reference symbols same as those of the first disc drive unit 5 and will not be described any further.

The adaptor member 50 includes a substantially box-shaped base body 51, a fitting section 52 formed at a side of the base body 51 so as to be fitted to the second supporting piece 32 of the optical pickup 20 and a support section 53 located at the opposite side of the base body 51 where the fitting section 52 is arranged and adapted to be supported by the sub shaft 29*b* of the second disc drive unit 5*a*.

Of the above listed components, the base body 51 is a part to be pinched by the guide groove 32*a* when the adaptor member is fitted to the second supporting piece 32. The fitting section 52 includes a pair of resiliently deformable pieces 52*a*, 52*b* arranged at opposite sides of the base body 51 that is pinched by the guide groove 32*a* so as to by turn transversally pinch the second supporting piece 32 and an engagement groove 52*b* formed between the pair of resiliently deformable pieces 52*a*, 52*a* and running vertically so as to be engaged with the second supporting piece 32. The support section 53 is formed with a guide groove 53*a* running transversally and adapted to pinch the sub shaft 29*b* of the second disc drive unit 5*a*.

Figure 11:
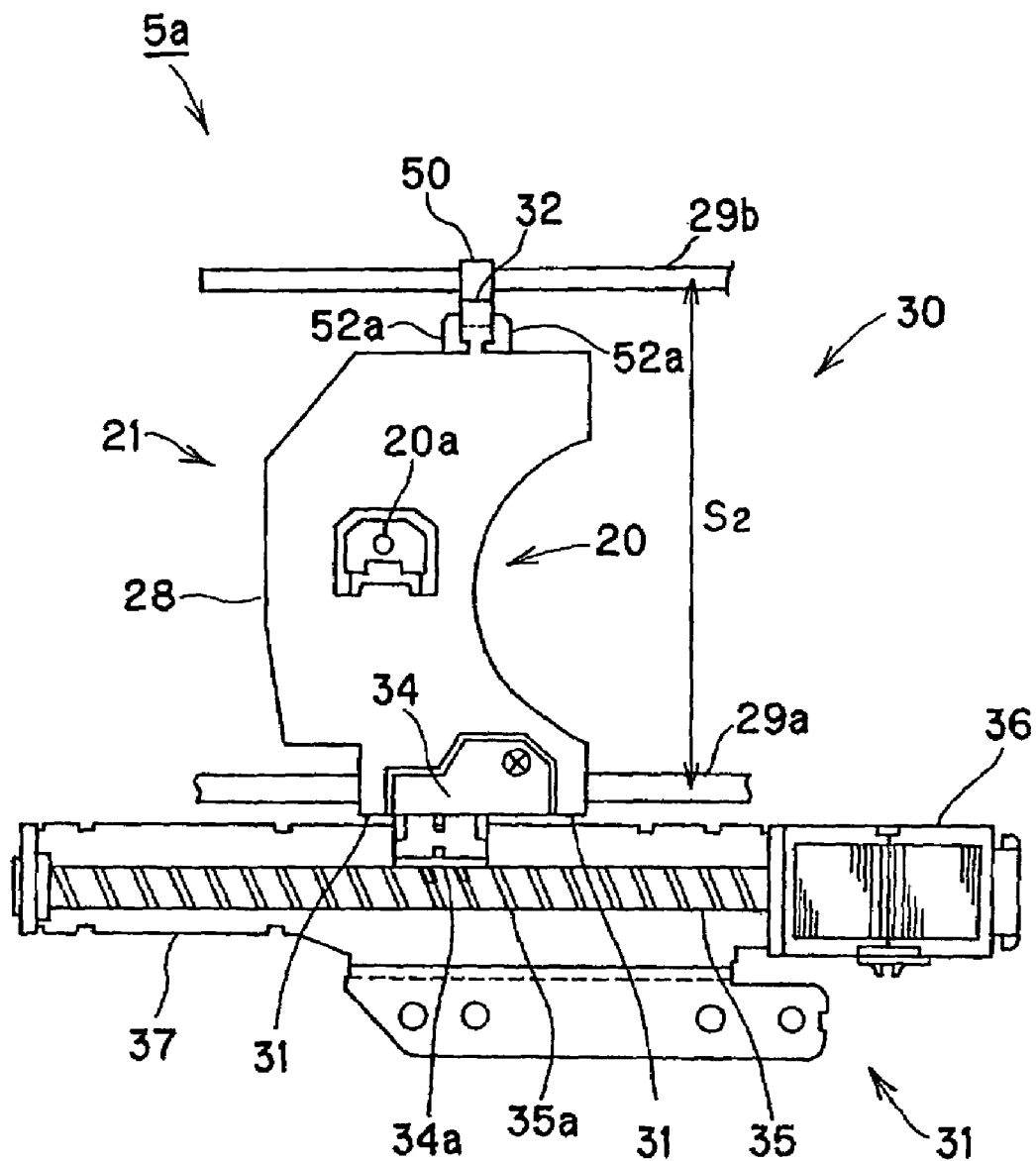
FIG. 11 is a schematic plan view of the second disc drive unit to which the adaptor member of FIG. 9 is fitted, showing a principal part thereof.

Referring now to FIGS. 10 and 11, the adaptor member 50 having the above described configuration is fitted to the second supporting piece 32 as the pair of resiliently deformable pieces 52*a*, 52*a* transversally pinch the second supporting piece 32 between them in a state where the base body 51 is pinched by the guide groove 32*a* of the second supporting piece 32 and the engaging groove 52*b* is engaged with the second supporting piece 32. It is possible to rigidly secure the adaptor member 50 to the second supporting piece 32 by means of an adhesive agent after fitting it to the second supporting piece 32. It is also possible to rigidly secure the adaptor member 50 to the second supporting piece 32 by means of one or more than one screws or by caulking.

As a result, in the second disc drive unit 5*a* having the main shaft 29*a* and the sub shaft 29*b* that are oppositely disposed and separated from each other by a distance S2 greater than the distance S1 separating the main shaft 29*a* and the sub shaft 29*b* of the first disc drive unit 5 the main shaft 29*a* is made to run through the guide holes 31*a* of the first supporting pieces 31 and the sub shaft 29*b* is pinched by the guide groove 53*a* of the adaptor member 50 so that consequently the pickup base 28 is supported so as to be able to slide in a radial direction of the optical disc 2.

Thus, in the above described embodiment of disc drive apparatus 1 according to the invention, it is possible to mount the optical pickup 20 in the second disc drive unit 5*a* whose main shaft 29*a* and sub shaft 29*b* are oppositely disposed and separated from each other by a distance S2 greater than the distance S1 separating the main shaft 29*a* and the sub shaft 29*b* of the first disc drive unit 5 by fitting the adaptor member 50 to the second supporting piece 32 of the optical pickup 20 to be mounted in the first disc drive unit 5.

The above-described embodiment of adaptor member 50 according to the invention is by no means limited to the above configuration. For example, an adaptor member 60 having a configuration as shown in FIG. 12 may alternatively be used for the purpose of the present invention.

Figure 12:
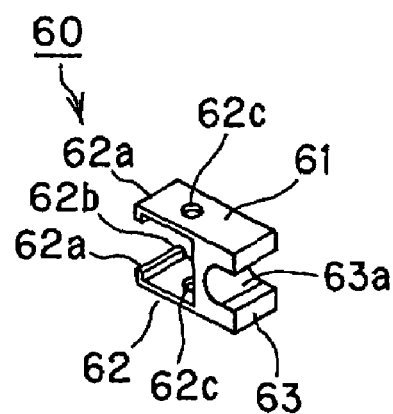
FIG. 12 is a schematic perspective view of an adaptor member realized by modifying the adaptor member of FIG. 9.

More specifically, the adaptor member 60 of FIG. 12 includes a substantially box-shaped base body 61, a fitting section 62 formed at a side of the base body 61 so as to be fitted to the second supporting piece 32 of the optical pickup 20 and a support section 63 located at the opposite side of the base body 61 where the fitting section 62 is arranged and adapted to be supported by the sub shaft 29b of the second disc drive unit 5a.

Of the above-listed components, the fitting section 62 includes a pair of resiliently deformable pieces 62a, 62a arranged so as to vertically pinch the second supporting piece 32 and an engagement groove 62b is formed between the pair of resiliently deformable pieces 62a, 62a and running transversally so as to be engaged with the second supporting piece 32. The pair of resiliently deformable pieces 62a, 62b are provided with respective engaging holes 62c to be engaged with an aligning pin formed on the second supporting piece 32. The support section 63 is formed with a guide groove 63a running transversally and adapted to pinch the sub shaft 29b of the second disc drive unit 5a.

Figure 13:
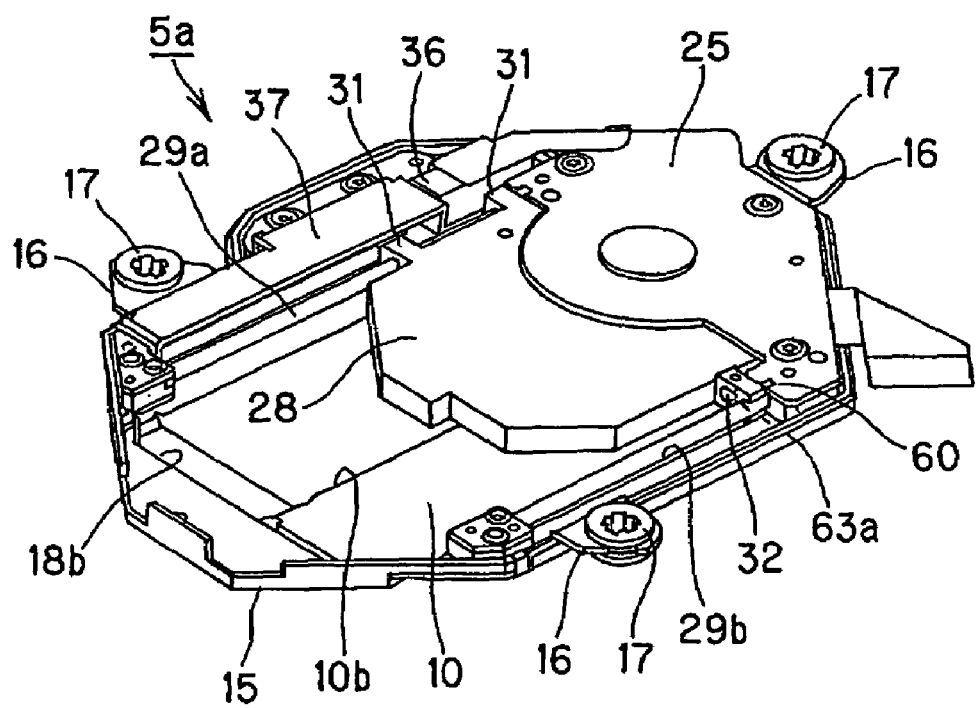
FIG. 13 is a schematic perspective view of the second disc drive unit to which the adaptor member of FIG. 12 is fitted.
Figure 14:
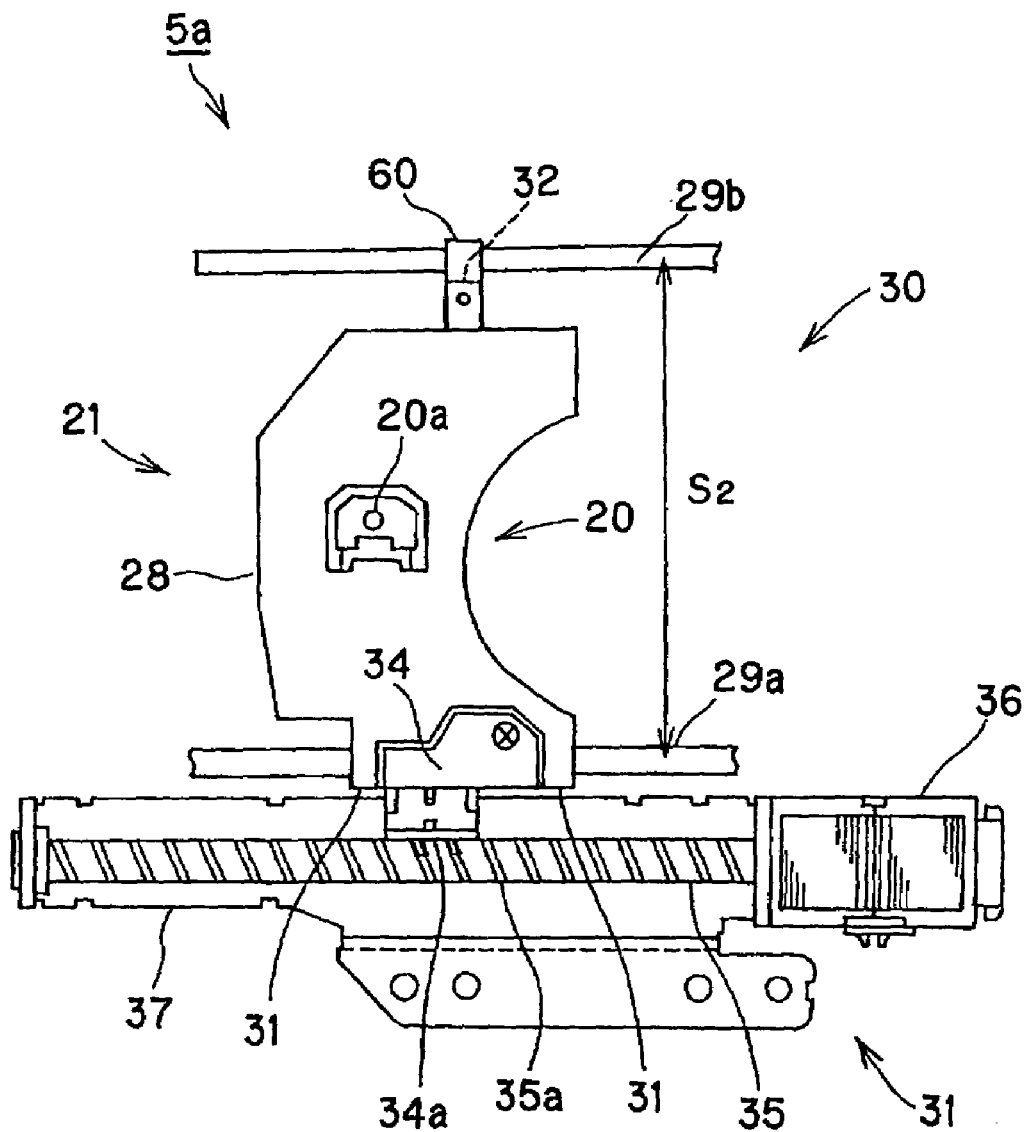
FIG. 14 is a schematic plan view of the second disc drive unit to which the adaptor member of FIG. 12 is fitted, showing a principal part thereof.

Referring now to FIGS. 13 and 14, the adaptor member 60 having the above described configuration is fitted to the second supporting piece 32 of the pickup base 28 as the pair of resiliently deformable pieces 62a, 62a vertically pinch the second supporting piece 32 between them in a state where the engaging groove 62b is engaged with the second supporting piece 32. It is possible to rigidly secure the adaptor member 60 to the second supporting piece 32 by means of an adhesive agent after fitting it to the second supporting piece 32. It is also possible to rigidly secure the adaptor member 60 to the second supporting piece 32 by means of one or more than one screws or by caulking.

As a result, in the second disc drive unit 5a having the main shaft 29a and the sub shaft 29b that are oppositely disposed and separated from each other by a distance S2 greater than the distance S1 separating the main shaft 29a and the sub shaft 29b of the first disc drive unit 5, the main shaft 29a is made to run through the guide holes 31a of the first supporting pieces 31 and the sub shaft 29b is pinched by the guide groove 63a of the adaptor member 60 so that consequently the pickup base 28 is supported so as to be able to slide in a radial direction of the optical disc 2.

Thus, in the above described embodiment of disc drive apparatus 1 according to the invention, it is possible to mount the optical pickup 20 in the second disc drive unit 5a whose main shaft 29a and sub shaft 29b are oppositely disposed and separated from each other by a distance S2 greater than the distance S1 separating the main shaft 29a and the sub shaft 29b of the first disc drive unit 5 by fitting the adaptor member 60 to the second supporting piece 32 of the optical pickup 20 to be mounted in the first disc drive unit 5.

Figure 15:
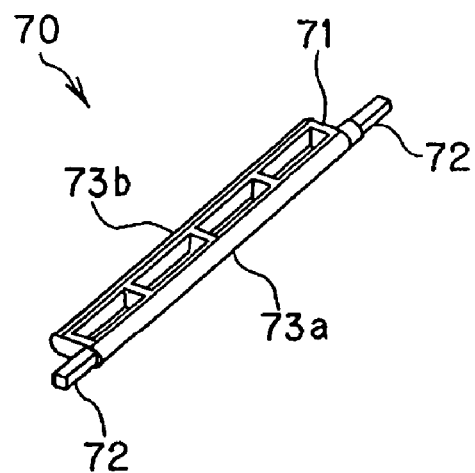
FIG. 15 is a schematic perspective view of another embodiment of adaptor member according to the invention.

In the above described embodiment of disc drive apparatus 1 according to the invention, another embodiment of adaptor member 70 according to the invention and illustrated in FIG. 15 may be fitted to the sub shaft 29b of the second disc drive unit 5a in order to mount the optical pickup 20, which is currently mounted in the first disc drive unit 5, in the second disc drive unit 5a.

Now, this embodiment of adaptor member 70 and the embodiment of second disc drive unit 5a to which the embodiment of adaptor member 70 is fitted will be described below in detail.

The adaptor member 70 includes an oblong and substantially box-shaped base body 71 and a pair of spindles 72, 72 formed at a side of the base body 71 so as to be fitted to the bottom surface of the base 15 by way of the above described skew regulation mechanism 33 at the longitudinal opposite ends of the base body 71. The paired spindles 72, 72 are biased toward a lateral side of the base body 71 relative to the central axis of the latter. The base body 71 is provided at a lateral side thereof toward which the paired spindles 72, 72 are biased with a first guide section 73a to be engaged with the guide groove 32a of the optical pickup 20 when mounted in the first disc drive unit 5 and at the lateral side thereof opposite to the first guide section 73a with a second guide section 73b to be engaged with the guide groove 32a of the optical pickup 20 when mounted in the second disc drive unit 5a.

Figure 16:
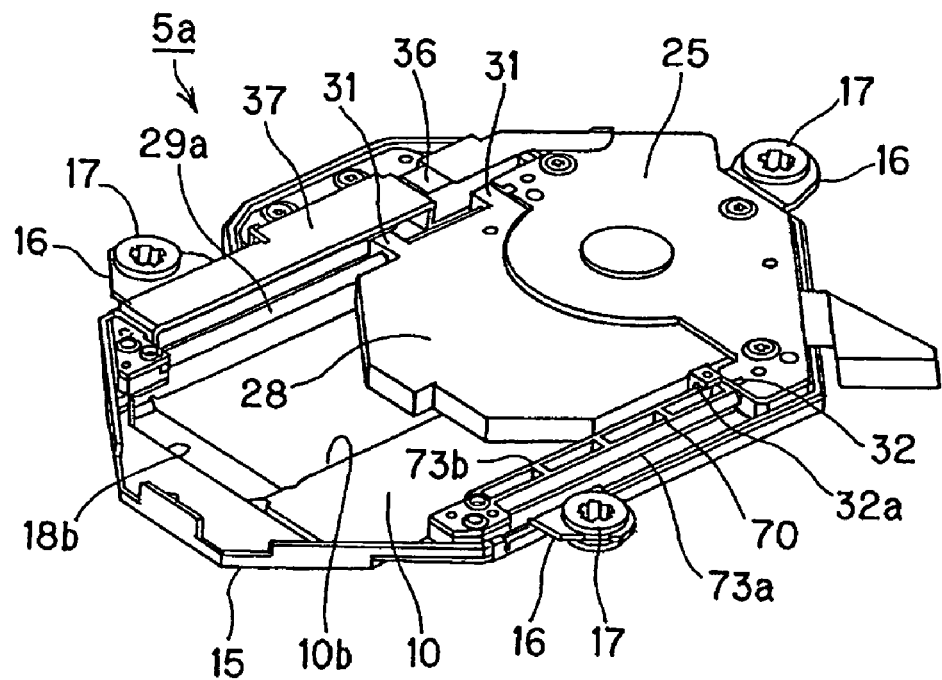
FIG. 16 is a schematic perspective view of the second disc drive unit to which the adaptor member of FIG. 15 is fitted.
Figure 17:
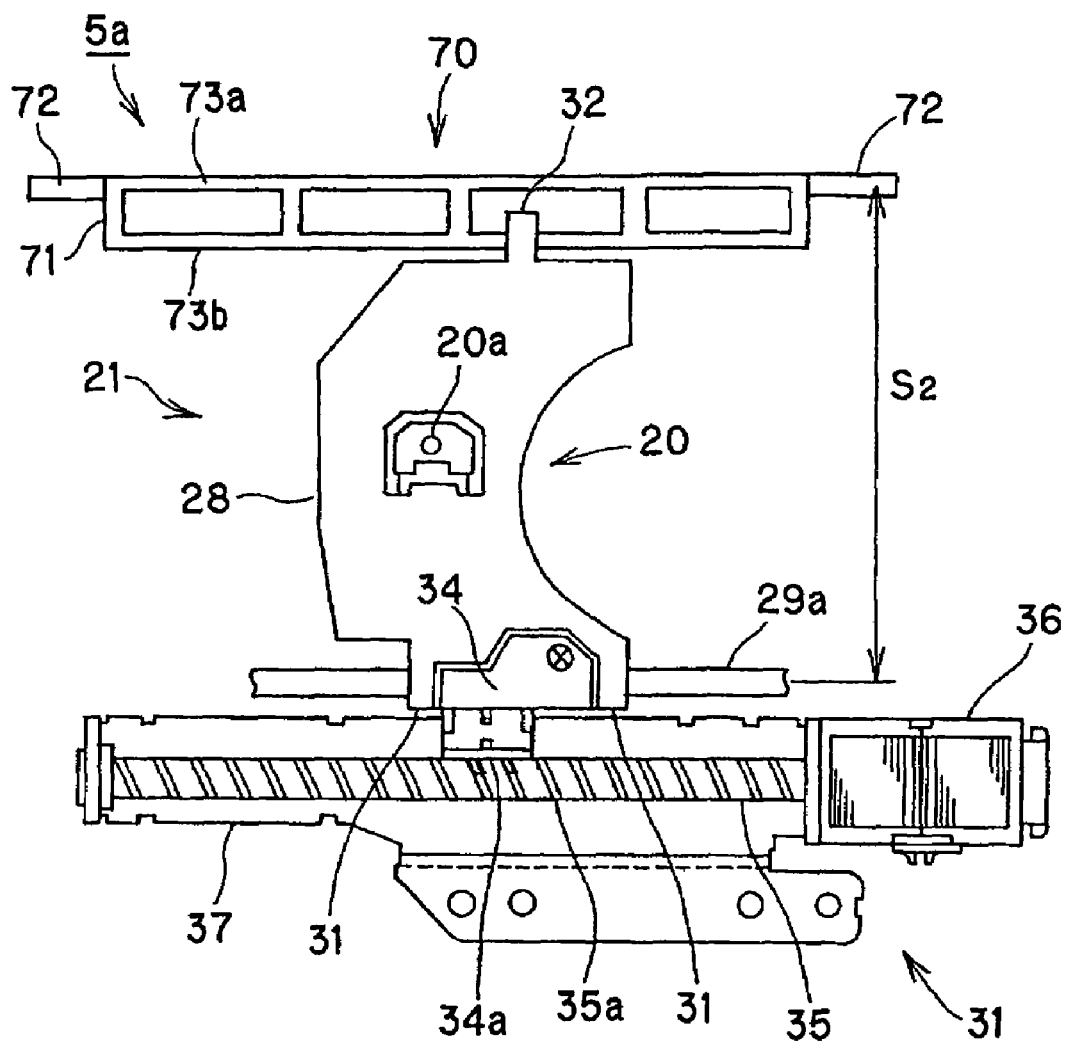
FIG. 17 is a schematic plan view of the second disc drive unit to which the adaptor member of FIG. 15 is fitted, showing a principal part thereof.

The paired spindles 72, 72 of the adaptor member 70 having the above described configuration are fitted to the bottom surface of the base 15 by way of the above described skew regulation mechanism 33 with the second guide section 73b facing the main shaft 29a as shown in FIGS. 16 and 17.

As a result, in the second disc drive unit 5a having the main shaft 29a and the sub shaft 29b that are oppositely disposed and separated from each other by a distance S2 greater than the distance S1 separating the main shaft 29a and the sub shaft 29b (which is the adaptor member 70 in this case) of the first disc drive unit 5, the main shaft 29a is made to run through the guide holes 31a of the first supporting pieces 31 and the guide section 73b of the adaptor member 70 is pinched by the guide groove 32a of the second supporting piece 32 so that consequently the pickup base 28 is supported so as to be able to slide in a radial direction of the optical disc 2.

Thus, in the above described embodiment of disc drive apparatus 1 according to the invention, it is possible to mount the optical pickup 20 in the second disc drive unit 5a whose main shaft 29a and sub shaft 29b are oppositely disposed and separated from each other by a distance S2 greater than the distance S1 separating the main shaft 29a and the sub shaft 29b of the first disc drive unit 5 by fitting the adaptor member 70 as the sub shaft 29b of the second disc drive unit 5a.

On the other hand, the adaptor member 70 can also be fitted as the sub shaft 29b of the first disc drive unit 5.

Figure 18:
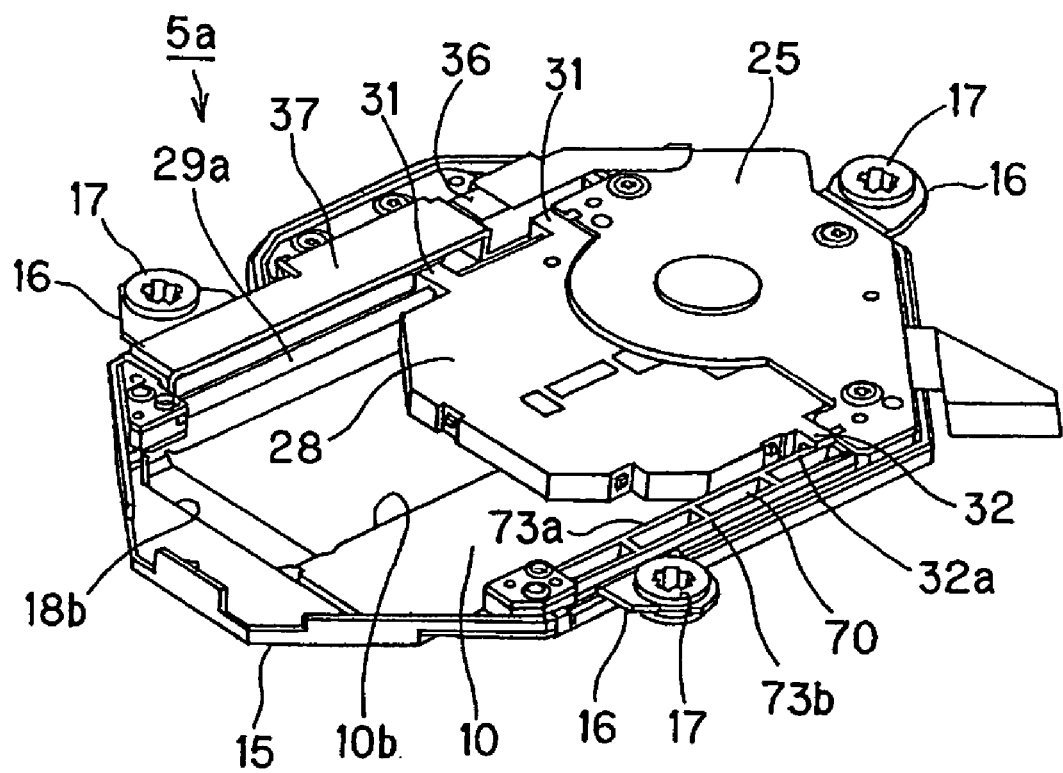
FIG. 18 is a schematic perspective view of the first disc drive unit to which the adaptor member of FIG. 15 is fitted.
Figure 19:
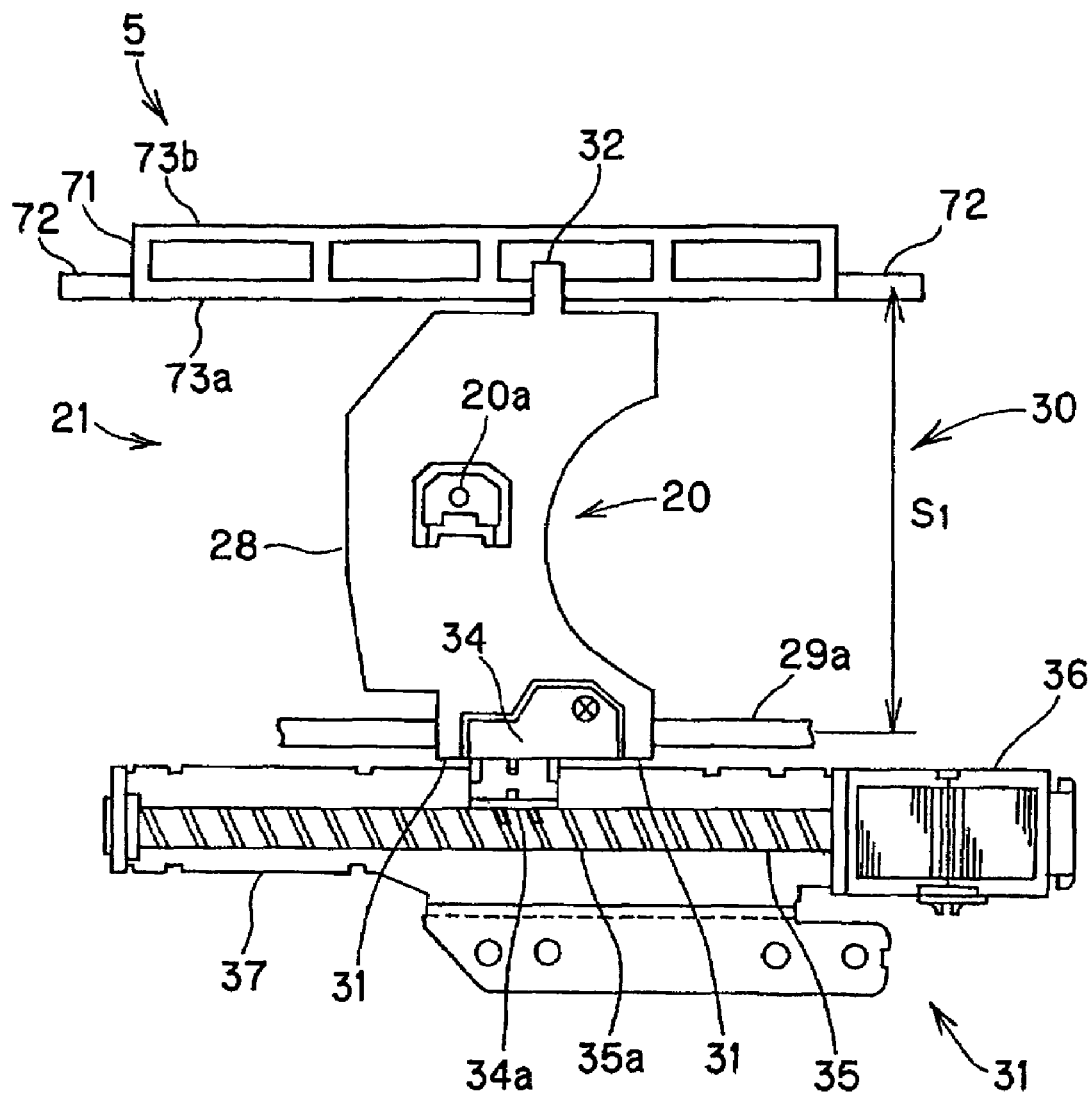
FIG. 19 is a schematic plan view of the first disc drive unit to which the adaptor member of FIG. 15 is fitted, showing a principal part thereof.

More specifically, when the adaptor member 70 is fitted as the sub shaft 29b of the first disc drive unit 5b, it is fitted to the side opposite to the side that is used when the adaptor member 70 is fitted as the sub shaft 29b of the second disc drive unit 5a, as shown in FIGS. 18 and 19. In other words, the paired spindle 72, 72 are fitted to the bottom surface of the base 15 by way of the above described skew regulation mechanism 33 in such a way that the first guide section 73a faces the main shaft 29a.

As a result, in the first disc drive unit 5 having the main shaft 29a and the sub shaft 29b (which is the adaptor member 70 in this case) that are oppositely disposed and separated from each other by a distance S1 smaller than the distance S2 separating the main shaft 29a and the sub shaft 29b of the second disc drive unit 5a, the main shaft 29a is made to run through the guide holes 31a of the first supporting pieces 31 and the first guide section 73a of the adaptor member 70 is pinched by the guide groove 32a of the second supporting piece 32 so that consequently the pickup base 28 is supported so as to be able to slide in a radial direction of the optical disc 2.

Thus, in this embodiment of disc drive apparatus 1, the above described adaptor member 70 can be fitted to either of the first and second disc drive units 5, 5a.

As described above in detail, in this embodiment of disc drive apparatus 1 according to the invention, the optical pickup 20 that is currently mounted in the first disc drive unit 5 of the two disc drive units 5a, 5b whose distances S1, S2 separating the main shaft 29a and the sub shaft 29b that are oppositely disposed and separated from each other are different from each other, the first disc drive unit 5 having the distance S1 smaller than the distance S2 separating the main shaft 29*a* and the sub shaft 29*b* of the second disc drive unit 5*a*, in the second disc drive unit 5*a* having the longer distance S2 by fitting any of the adaptor members 50, 60 and 70 for adjusting the distance separating the main shaft 29*a* and the sub shaft 29*b* that are oppositely disposed.

Since an optical pickup 20, which is common to the first and second disc drive units 5, 5*a* whose distances S1, S2 separating the main shaft 29*a* and the sub shaft 29*b* that are oppositely disposed and separated from each other are different from each other, is mounted in the above embodiment of disc drive apparatus 1, it is possible to commonly use parts, manufacturing facilities and so forth and hence remarkably reduce the cost of manufacturing the metal molds, that of managing components and that of replacing facilities.

While the adaptor member 70 that is integrally formed with the sub shaft 29*b* is fitted to the second disc drive unit 5*a* in the above description, the present invention is by no means limited thereto and it is also possible to fit an independent adaptor member for adjusting the distance separating the main shaft 29*a* and the sub shafts 29*b* that are oppositely disposed in order to mount the optical pickup 20 that is currently mounted in the first disc drive unit 5 in the second disc drive unit 5*a*.

For the purpose of the present invention, it may be conceivable to arrange an adaptor member for adjusting the distance separating the main shaft 29*a* and the sub shaft 29*b* that are oppositely disposed at the side of the main shaft 29*a* in order to mount the optical pickup 20 that is currently mounted in the first disc drive unit 5 in the second disc drive unit 5*a*. However, the above described displacement/drive mechanism 30 is arranged at the side of the main shaft 29*a* and hence another adjusting member has to be arranged between the main shaft 29*a* and the displacement/drive mechanism 30 if it is arranged at the side of the main shaft 29*a*. Therefore, it is desirable to arrange the adaptor member at the side of the sub shaft 29*b*. Then, it is possible to further reduce the cost.

For the purpose of the present invention, the feed screw 35 of the above described displacement/drive mechanism 30 may be integrally formed with the main shaft 29*a*.

The present invention is applicable not only to a tray-type disc drive apparatus 1 as described above but also to a slot-in type disc drive apparatus where an optical disc is inserted into and taken out from it by way of a disc insertion/removal port formed at the front side of the cabinet.

The present invention is applicable not only to the above described optical disc 2 but also to an optical disc different from the above described one such as a magneto-optical disc and to a disc drive apparatus adapted to record information signals on and/or reproduce information signals from an optical disc that is contained in an disc drive cartridge.

It should be understood by those skilled in the art that various modifications, combinations, sub-combinations and alterations may occur depending on design requirements and other factors insofar as they are within the scope of the appended claims or the equivalents thereof.

What is claimed is:

1. An adaptor member for allowing an optical pickup mounted in a first disc drive unit having respective main shaft and sub shaft arranged opposite relative to and in parallel with each other and separated from each other by a distance to be mounted in a second disc drive unit having respective main shaft and sub shaft arranged opposite relative to and in parallel with each other and separated from each other by a distance, the distance separating the main shaft and the sub shaft of the first disc drive unit being smaller than the distance separating the main shaft and the sub shaft of the second disc drive unit, the adaptor member being adapted to be fitted to a second supporting section of the optical pickup mounted in the first disc drive unit, the second supporting section being formed with a guide groove for pinching the sub shaft and arranged opposite to a first supporting section formed with a guide hole for allowing the main shaft to run through it, the adaptor member having a guide groove for pinching the sub shaft of the second disc drive unit.

2. An adaptor member for allowing an optical pickup mounted in a first disc drive unit having respective main shaft and sub shaft arranged opposite relative to and in parallel with each other and separated from each other by a distance to be mounted in a second disc drive unit having respective main shaft and sub shaft arranged opposite relative to and in parallel with each other and separated from each other by a distance, the distance separating the main shaft and the sub shaft of the first disc drive unit being smaller than the distance separating the main shaft and the sub shaft of the second disc drive unit, the adaptor member being fitted to or integrally formed with the sub shaft of the second disc drive unit and having a guide section to be pinched by a guide groove formed in a second supporting section of the optical pickup, the second supporting section being arranged opposite to a first supporting section formed with a guide hole for allowing the main shaft to run through it.

3. The adaptor member according to claim 2, further comprising:

a first guide section to be pinched between the guide groove formed in the second supporting section of the optical pickup mounted in the first disc drive unit upon being fitted to a longitudinal end of the first disc drive unit as the sub shaft thereof, and a second guide section to be pinched between the guide groove formed in the second supporting section of the optical pickup to be mounted in the first disc drive unit upon being fitted to an other longitudinal end of the second disc drive unit as the sub shaft thereof opposite relative to its position on the first disc drive unit when fitted as the sub shaft thereof.

4. A disc drive unit including a disc rotary drive mechanism for driving an optical disc to rotate, an optical pickup for writing signals on or reading signals from the optical disc, and a pickup feed mechanism for feeding the optical pickup in a radial direction of the optical disc, to which components are integrally arranged on a base;

the pickup feed mechanism comprising:

a main shaft and a sub shaft, a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged opposite relative to each other, an adaptor member adapted to be fitted to the second supporting section and formed with a guide groove for pinching the sub shaft, and a displacement/drive mechanism for driving the pickup base in a radial direction of the optical disc; wherein the pickup base being supported and allowed to slide in a radial direction of the optical disc by making the main shaft run through the guide hole of the first supporting section and the sub shaft to be pinched by the guide groove of the adaptor member.

5. A disc drive unit including a disc rotary drive mechanism for driving an optical disc to rotate, an optical pickup for writing signals on or reading signals from the optical disc, and a pickup feed mechanism for feeding the optical pickup in a radial direction of the optical disc, to which components are integrally arranged on a base;

the pickup feed mechanism comprising:

a main shaft and a sub shaft, a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged opposite relative to each other, an adaptor member adapted to be fitted to or integrally formed with the sub shaft and having a guide section to be pinched by the guide groove formed in the second supporting section, and a displacement/drive mechanism for driving the pickup base in a radial direction of the optical disc; wherein the pickup base being supported and allowed to slide in a radial direction of the optical disc by making the main shaft run through the guide hole of the first supporting section and the guide section of the adaptor member to be pinched by the guide groove of the second supporting section.

6. A disc drive apparatus having a disc drive unit including a disc rotary drive mechanism for driving an optical disc to rotate, an optical pickup for writing signals on or reading signals from the optical disc, and a pickup feed mechanism for feeding the optical pickup in a radial direction of the optical disc, to which components are integrally arranged on a base, and a cabinet for containing the disc drive unit;

the pickup feed mechanism comprising:

a main shaft and a sub shaft, a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged opposite relative to each other, an adaptor member adapted to be fitted to the second supporting section and formed with a guide groove for pinching the sub shaft, and a displacement/drive mechanism for driving the pickup base in a radial direction of the optical disc; wherein the pickup base being supported and allowed to slide in a radial direction of the optical disc by making the main shaft run through the guide hole of the first supporting section and the sub shaft to be pinched by the guide groove of the adaptor member.

7. A disc drive apparatus having a disc drive unit including a disc rotary drive mechanism for driving an optical disc to rotate, an optical pickup for writing signals on or reading signals from the optical disc, and a pickup feed mechanism for feeding the optical pickup in a radial direction of the optical disc, to which components are integrally arranged on a base, and a cabinet for containing the disc drive unit;

the pickup feed mechanism comprising:

a main shaft and a sub shaft, a pickup base carrying an optical pickup and having a first supporting section formed with a guide hole for allowing the main shaft to run through it and a second supporting section formed with a guide groove for pinching the sub shaft of a disc drive unit with a smaller distance separating the main shaft and the sub shaft arranged opposite relative to each other, an adaptor member adapted to be fitted to or integrally formed with the sub shaft and having a guide section to be pinched by the guide groove formed in the second supporting section, and a displacement/drive mechanism for driving the pickup base in a radial direction of the optical disc;

the pickup base being supported and allowed to slide in a radial direction of the optical disc by making the main shaft run through the guide hole of the first supporting section and the guide section of the adaptor member to be pinched by the guide groove of the second supporting section.

* * * * *